(12) United States Patent
Bauchot et al.

(10) Patent No.: US 7,962,574 B2
(45) Date of Patent: Jun. 14, 2011

(54) DATA INTEGRATION IN SERVICE ORIENTED ARCHITECTURES

(75) Inventors: Frederic Bauchot, Saint-Jeannet (FR); Hubert Lalanne, Colomiers (FR)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 12/362,058

(22) Filed: Jan. 29, 2009

(65) Prior Publication Data

US 2010/0192004 A1   Jul. 29, 2010

(30) Foreign Application Priority Data

Jan. 29, 2009   (FR) ..................... 09 30507

(51) Int. Cl.
G06F 15/16   (2006.01)
(52) U.S. Cl. .......... 709/218; 709/216; 709/217
(58) Field of Classification Search .......... 709/212, 709/213, 214, 215, 216, 217, 218, 219, 246; 717/104; 718/101; 719/313; 713/153; 705/14
See application file for complete search history.

(56) References Cited

U.S. PATENT DOCUMENTS

| | | | |
|---|---|---|---|
| 2009/0049444 A1* | 2/2009 | Ottavi et al. | 718/101 |
| 2009/0094112 A1* | 4/2009 | Cesarini et al. | 705/14 |
| 2009/0094453 A1* | 4/2009 | Bradley et al. | 713/153 |
| 2009/0187919 A1* | 7/2009 | Maes | 719/313 |
| 2010/0057515 A1* | 3/2010 | Gandini et al. | 718/101 |
| 2010/0107135 A1* | 4/2010 | Arsanjani et al. | 717/104 |

* cited by examiner

*Primary Examiner* — Le Luu
(74) *Attorney, Agent, or Firm* — Andrea Bauer; Hoffman Warnick LLC (57) ABSTRACT

A system, method and program product for transferring structured and unstructured data in a service oriented architecture (SOA) infrastructure. A method is disclosed that includes: receiving a request for a synchronization at a service orchestration engine (SOE), wherein the synchronization includes a transfer of structured meta-data from a first node to a second node and a transfer of unstructured file data from a first file node to a second file node; creating an entry in a routing table to track the synchronization; receiving the structured meta-data at the SOE from the first node and transferring the structured meta-data to the second node; and orchestrating a peer-to-peer data transfer from the first file node to the second file node, including communicating with file handling agents at the first and second file handling nodes.

22 Claims, 7 Drawing Sheets

| | |
|---|---|
| File Transfer Id | Id to be generated automatically by the synchronization process |
| Anchor Object Id | This is the object in the metadata flow that the considered file should refer to (i.e. a part or sub-assembly for a BoM). At the end of the file transfer the target object will be updated with the Target File Locator |
| Source Node | This is the address of the File Node where is located the Source File. To be provided by the Synchronization Process |
| Target Node | This is the address of the File Node where the Target File should be stored. To be provided by the Synchronization Process |
| Transformation Service | This is the generic name of the transformation process to be used. It should be provided by the Synchronization Process. The File Orchestrator will get its actual implementation from the Service Registry. Can be set to N/A if no transformation is needed |
| Transformation Node | This is the address of the File Node where is located the Transformation Engine. The File Orchestrator will get its actual value from the Service Registry |
| Source File Locator | This is the reference to the source file to be transferred and or transformed. It is read by the synchronization process in the metadata retrieved from the source Metadata Node |
| To-be-transformed File Locator | This is the reference to the intermediate file transferred from the Source Node to the Transformation Node. N/A if no transformation is needed. Can be generated by the File Orchestrator. N/A if no transformation is needed |
| Transformed File Locator | This is the reference to the intermediate file transformed on the Transformation Node. N/A if no transformation is needed. Can be generated by the File Orchestrator |
| Target File Locator | This is the reference to the target file transferred and/or transformed. Can be generated by the File Orchestrator. It will be set in the metadata flow that will update the target Metadata Node |
| Initial Transfer Status | Status or Return code from the initial transfer |
| Transformation Status | Status or Return code from the transformation |
| Final Transfer Status | Status or Return code from the final transfer |

DATA INTEGRATION IN SERVICE ORIENTED ARCHITECTURES

FIELD OF THE INVENTION

The invention relates generally to managing data communicated between applications, and more particularly to a system and method of managing structured and unstructured data being communicated among applications in a service oriented architecture.

BACKGROUND OF THE INVENTION

It is often necessary for applications operating in a service oriented architecture (SOA) to exchange data that includes unstructured information (e.g., documents, files, etc.) and structured information (e.g., meta-data) that describes the unstructured information. For example, in a Product Lifecycle Management environment, there may be a need to exchange product overviews (i.e., structured data e.g., in an XML format) and associated design and development documents (i.e., unstructured data in computer aided design CAD files).

Current SOA software products are primarily suited to handle synchronous exchanges of structured data sets of limited size. Such approaches ensure a high Quality of Service. Unfortunately, there are situations in which the data to be transferred combines large volumes of both structured and unstructured data. In addition, it is not unusual for unstructured data to be distributed across a network, e.g., close to the users. Accordingly, there may be hundreds or thousands of nodes involved. Furthermore, current products are not suited to support the transformation of file formats or to provide restart capabilities on an exchange flow that has been partially processed.

Accordingly, a need exists for a solution that allows for the transfer of structured and unstructured data in a SOA infrastructure.

SUMMARY OF THE INVENTION

The present invention addresses the above-mentioned problems, as well as others, by providing an SOA infrastructure that can handle the transfer of structured and unstructured data. In a first aspect, the invention provides a service oriented architecture (SOA) infrastructure that includes facilities for transferring structured data and associated unstructured data among nodes in a network, comprising: a service orchestration engine (SOE) having a file orchestrator and a facility for receiving structured data from a first node and transferring the structured data to a second node; and a plurality of file handling agents installed at a plurality of respective file nodes, wherein a first file handling agent at a first file node and a second file handling agent at a second file node communicate with the file orchestrator to effectuate a peer-to-peer file transfer between the first file node and the second file node.

In a second aspect, the invention provides a computer program product stored on a computer readable medium, which when executed by a computing device within a service oriented architecture (SOA) infrastructure, comprises: program code that receives structured data from a first node and transfers the structured data to a second node; and program code that orchestrates peer-to-peer unstructured data transfers among a plurality of file nodes in the SOA infrastructure, including communicating with file handling agents installed in the plurality of file nodes, wherein the orchestration includes parallel processing of a plurality of peer-to-peer unstructured data transfers.

In a third aspect, the invention provides a method of transferring structured and unstructured data in a service oriented architecture (SOA) infrastructure, comprising: receiving a request for a synchronization at a service orchestration engine (SOE), wherein the synchronization includes a transfer of structured meta-data from a first node to a second node and a transfer of unstructured file data from a first file node to a second file node; creating an entry in a routing table to track the synchronization; receiving the structured meta-data at the SOE from the first node and transferring the structured meta-data to the second node; and orchestrating a peer-to-peer data transfer from the first file node to the second file node, including communicating with file handling agents at the first and second file handling nodes.

In a fourth aspect, the invention provides a method for deploying a system for transferring structured and unstructured data in a service oriented architecture (SOA) infrastructure, comprising: providing a computer infrastructure being operable to: provide a service orchestration engine (SOE); receive a request for a synchronization at the SOE, wherein the synchronization includes a transfer of structured meta-data from a first node to a second node and a transfer of unstructured file data from a first file node to a second file node; create an entry in a routing table to track the synchronization; receive the structured meta-data at the SOE from the first node and transfer the structured meta-data to the second node; and orchestrate a peer-to-peer data transfer from the first file node to the second file node, including communicating with file handling agents at the first and second file handling nodes.

Accordingly, the present invention provides an SOA integration pattern that can combine structured data flows and file (unstructured data) transfer flows. Unlike traditional integration patterns, multiple parallel flows are provided, rather that a single message flow combining both structured data and unstructured data, and multiple processing nodes can be utilized, rather than a single synchronization hub.

The solution combines the benefits of an EAI based approach (mainly data integrity and consistency) and a file transfer approach (performance, parallelization) while leveraging a new SOA model. Advantages include the ability to leverage parallelization of the various activities in the synchronization process, including the processing, transformation and synchronization of structured and unstructured data, and the use of multiple data exchange path in order to optimize global data transfer flows. In addition, the present utilizes a bus integration pattern rather than a centralized node to process and transfer large unstructured data files.

BRIEF DESCRIPTION OF THE DRAWINGS

These and other features of this invention will be more readily understood from the following detailed description of the various aspects of the invention taken in conjunction with the accompanying drawings in which:

FIG. 7 depicts a routing table in accordance with an embodiment of the present invention.

DETAILED DESCRIPTION OF THE INVENTION

Service-oriented architecture (SOA) provides methods for systems development and integration where systems group functionality around business processes and package these as interoperable services. SOA also describes an information technology (IT) infrastructure that allows different applications to exchange data with one another as they participate in business processes. This disclosure is essentially focused on a solution for exchanging (i.e., synchronizing) structured and unstructured data among different applications (i.e., nodes) in an SOA infrastructure. In a typical embodiment, the structured data is presented in, or can be readily into, a predetermined format that can be readily understood by different applications. The structured data may comprise pointers or links to information in one or more files containing unstructured data.

Figure 1:
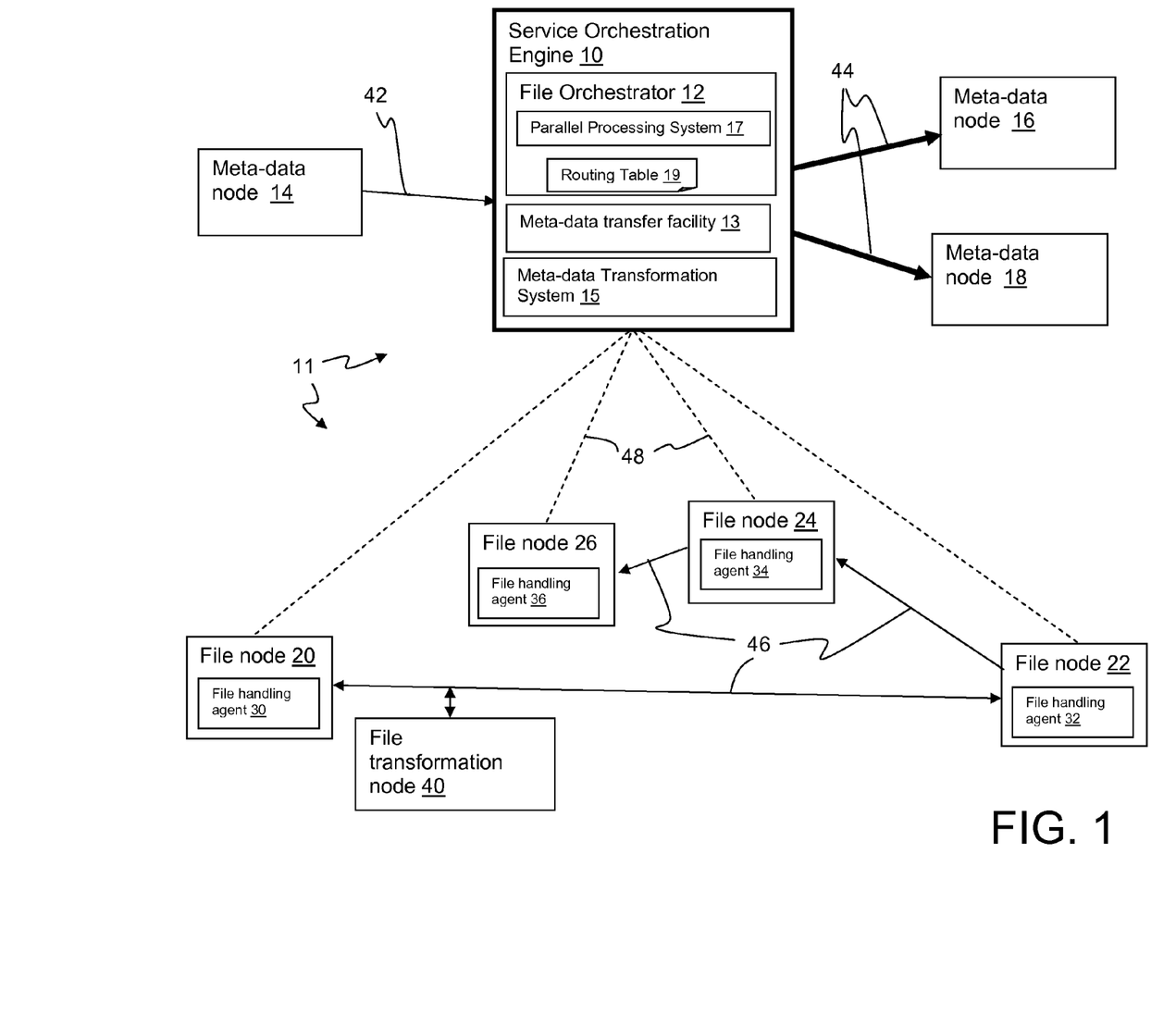
FIG. 1 depicts an SOA infrastructure in accordance with an embodiment of the present invention.

Referring now to drawings, FIG. 1 depicts an SOA infrastructure 11 having advanced capabilities for transferring structured and unstructured data from one application (i.e., node) to another application. In this case, the structured data comprises meta-data synchronized between meta-data node 14 and meta-data nodes 16 and 18; and the unstructured data comprises file data being synchronized among file nodes 20, 22, 24 and 26. As can be seen, the structured data is communicated via a centralized service orchestration engine (SOE) 10, whereas the unstructured data is communicated in a peer-to-peer fashion. Meta-data transfers are handled by a meta-data file transfer facility 13 at the SOE 10. In one illustrative embodiment, the SOE 10 may also include a meta-data transformation system 15 that transforms the meta-data received from node 14 to a format understood by nodes 16 and 18. Similarly, file nodes 20, 22, 24, 26 may access one or more file transformation nodes 40 to transform file formats. In order to ensure operability, a global synchronization process is provided by SOE 10 that can track and manage each of the different flows that occur in synchronizing data in accordance with the invention.

The SOA infrastructure 11 generally includes: a service orchestration engine 10 having a file orchestrator 12; meta-data nodes 14, 16, 18; file nodes 20, 22, 24, 26; and a plurality of file handling agents 32, 34, 36, 38 that reside with file nodes 20, 22, 24, 26, respectively. The service orchestration engine (SOE) 10 is the service choreographer within the SOA infrastructure 11. As shown, SOE 10 includes a file orchestrator 12, which is typically implemented as program code whose key role is to provide to the global synchronization process a consistent way to synchronize and monitor the various flows. Although shown as part of the SOE 10, file orchestrator 12 could be implemented at some other node in the infrastructure 11.

File orchestrator 12 manages all of the different filing handling situations or scenarios, which are described in further detail below. File orchestrator 12 include a parallel processing system 17 that allows multiple peer-to-peer file transfers to occur simultaneously. For example, a file transfer between file nodes 24 and 26 could occur at the same time a file transfer is occurring between file nodes 20 and 22. In order to manage this process, file orchestrator 12 utilizes a routing table 19 that tracks a set of information (i.e., an "entry") for each transfer. FIG. 7 depicts an overview of a routing table entry.

File handling agents 30, 32, 34, and 36 are also implemented as program code, and provide the counterpart functionality to the file orchestrator 12. Their key role is to wrap local file handling capabilities (e.g., transfer, transformation, localization, etc.) and to expose them as services to be called by the file orchestrator 12. Illustrative services include:

(1) Monitoring of file transfers using basic commands such as START/CANCEL, RESTART/STATUS, etc.

(2) Monitoring of file transformation using basic commands such as START and CANCEL. This will be available only on file nodes 20, 22, 24, 26 implementing File Format transformation capabilities.

(3) Managing the global transaction through file handling capabilities. Basic commands include DELETE and RENAME.

Overall, there are four main flows to consider. First, there is native structured data flow 42 in which data is exchanged between a source meta-data node 14 originating the synchronization request event and the SOE 10. Secondly, there is transformed structured data flow 44 exchanged between the SOE and the target meta-data nodes 16, 18 that should be synchronized. Meta-data transfer facility 13, which handles these two flows, may be implemented using any classical application integration approach.

A third type of flow is a file transfer flow 46 in peer to peer between the various file nodes that will implement the actual unstructured data exchanges. This may include both transformed and untransformed exchanges. Finally, file control flow 48 provides a mechanism to monitor file transfer flows among the file nodes from the SOE.

File control flow 48 is implemented based on processes and communications exchanged between the file orchestrator 12 and the file handling agents 30, 32, 34, 36. One job of the file control flow 48 is to monitor all file transfers between the file nodes. A second job is to monitor all file format transformations. A third job is to implement remote file handling capabilities.

Figure 2:
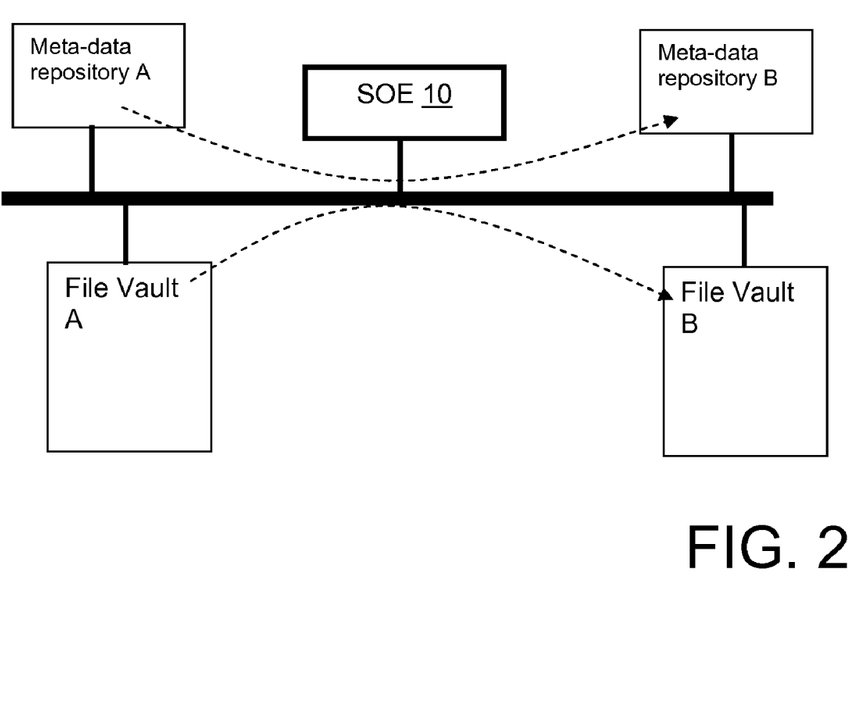
FIG. 2 depicts a one tone synchronization without file transformation in accordance with an embodiment of the present invention.
Figure 3:
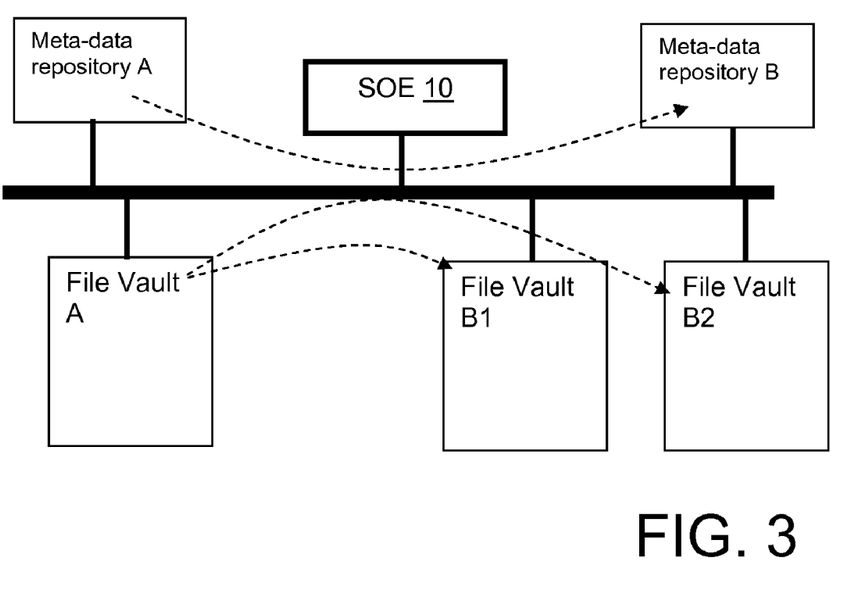
FIG. 3 depicts a one to many synchronization without file transformation in accordance with an embodiment of the present invention.

The following scenarios are considered and described in FIGS. 2-5:

One to one synchronization without file transformation (FIG. 2);

One to many synchronization without file transformation (FIG. 3);

One to many synchronization with file transformation (FIG. 4); and

Figure 5:
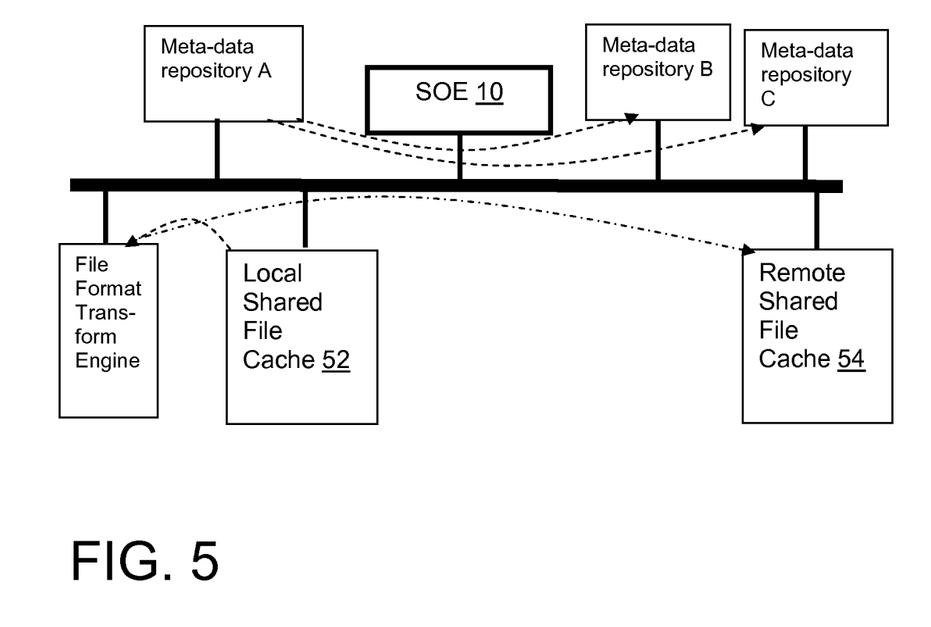
FIG. 5 depicts a one to many synchronization with file caching capabilities in accordance with an embodiment of the present invention.

One to many synchronization with file caching capabilities (FIG. 5).

FIG. 2 depicts a baseline scenario in which a source meta-data repository A is to be synchronized with a target meta-data repository B. Associated binary files, stored in file vault A are to be transferred with no transformation to file vault B. The enterprise service can be distributed over a combination of, e.g., WAN and LAN technologies. Any type of protocol could be utilized, e.g., JMS/MQ, http, etc. SOE 10 is in charge of running the global synchronization logic, and could be implemented using any technique, e.g., BPEL.

FIG. 3 depicts an alternative to the scenario shown in FIG. 2. In this case, the source meta-data repository A is to be synchronized with a target meta-data repository B. Depending on the context, however, associated binary files should be replicated either to file vault B1 or file vault B2 or both.

Figure 4:
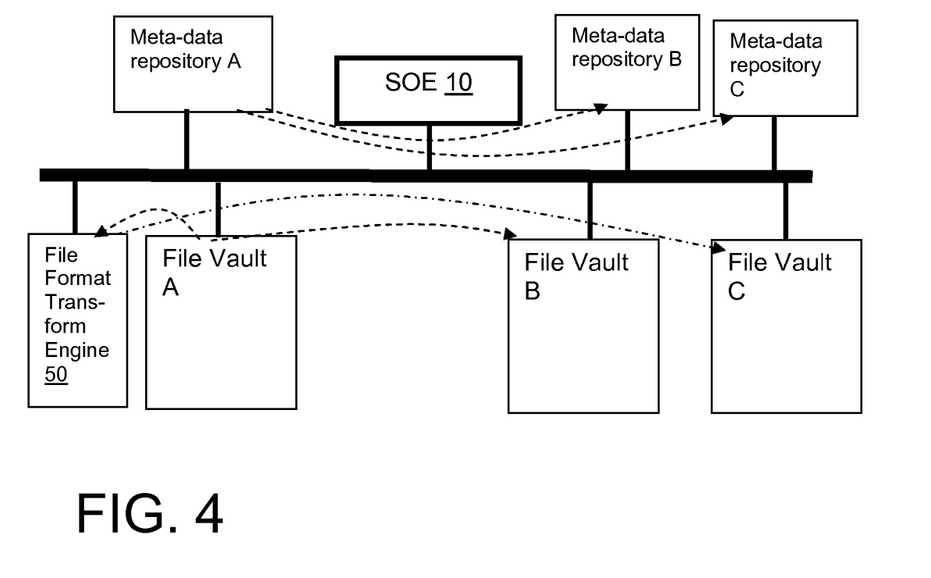
FIG. 4 depicts a one to many synchronization with file transformation in accordance with an embodiment of the present invention.

FIG. 4 depicts a scenario in which binary files from file vault A are to be transformed by file format transformation engine 50 before being copied to the target file vault C. For instance, there may be an instance where CAD data in file vault A needs to be transformed to another viewable file format (e.g., CGR, 3DXML, IGES) for storage in the target file vault C, but is acceptable for storage in target file vault B. This situation can be considered also when some useful data should be extracted from the binary flow (e.g., Dassault Systemes CATProduct format). Usually, such transformation engines are behaving as batch programs with one or many input files and one or many output FIG. 5 depicts a scenario in which there are no dedicated file vault capabilities for associated meta-data. Instead, the repository environment utilizes a shared file system implemented as a common cache 52, 54 for the various environments. This cache 52, 54 can be distributed geographically, and implement cache replication capabilities (in push or pull mode).

Figure 6:
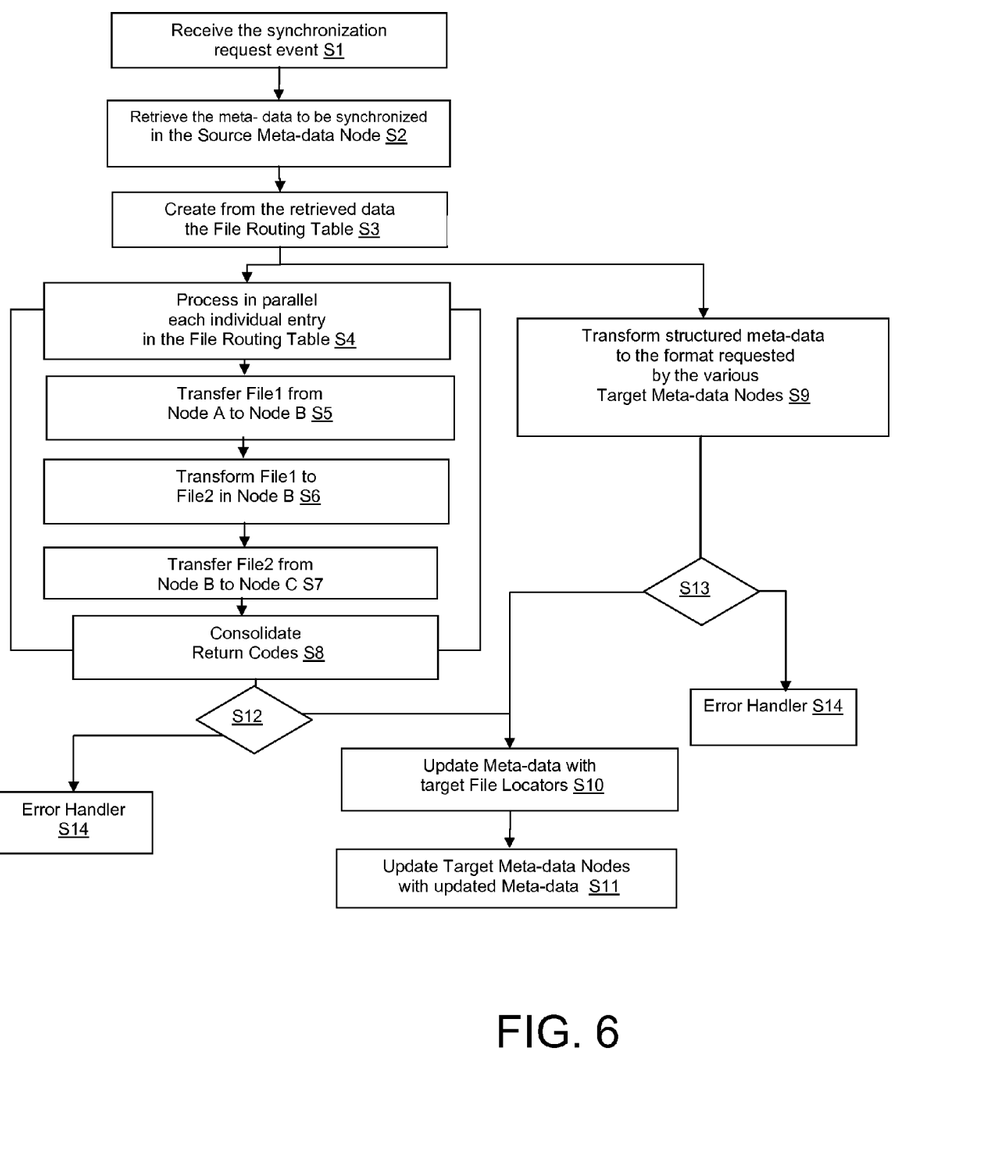
FIG. 6 depicts a flow diagram of an illustrative implementation of the file orchestration logic in accordance with an embodiment of the present invention.

FIG. 6 depicts a flow diagram of an illustrative implementation of the file orchestration logic. The logic can be implemented in any manner, including being based on WS-BPEL. The file orchestrator (FIG. 1) can be generic and exposed as an SCA component, in order to be reused in various synchronization processes.

At S1, a synchronization request event is received from an application. Next at S2, the meta-data to be synchronized is retrieved in at the source meta-data node. At S3, a file routing table entry is created based on the retrieved data. An illustrative routing table entry is shown in FIG. 7. At S4, each entry in the file routing table is processed in parallel (i.e., multiple simultaneous file transfers are implemented and tracked). There are various ways to implement parallel processing in BPEL such as the use of the FlowN verb (Oracle specific), the new BPEL 2.0 for-each verb, the use of event handlers, etc. At the same time, the structured meta-data is transformed (if necessary) to the format requested by the target meta-data nodes at S9.

At S5, a file (File1) is transferred from Node A to Node B in a peer-to-peer manner. At S6, File1 is transformed to File2 at Node B. The transformation may be implemented using a dynamic service call pattern. The transformation service, as exposed by the file handling agent (i.e., COMMAND verb) is published in a Service Registry. Therefore, the file orchestrator does not have to care about the transformation engine localization. It asks the Service Registry for the actual Transformation Service to be called. At S7, File2 is transferred from Node B to Node C and any return codes are consolidated at S8.

A decision is then made at S12 and S13 whether to implement an error handler S14 or update meta-data with target file locators S10 and update target meta-data nodes with updated meta-data S11. At this point the deletion of files corresponding to updated entries in the Target Meta Data nodes can be considered.

Figure 8:
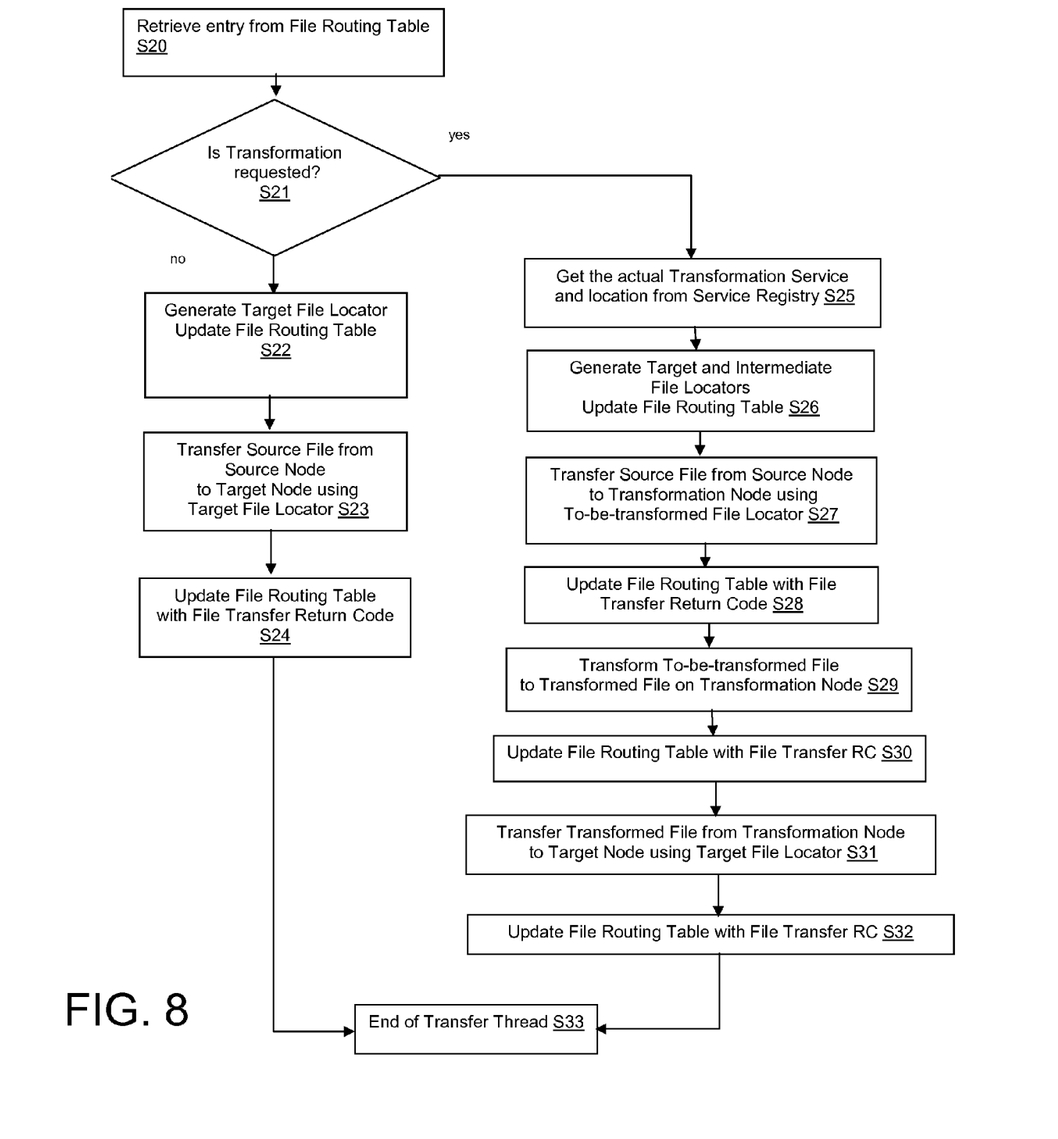
FIG. 8 depicts a flow diagram of illustrative file transfer logic in accordance with an embodiment of the present invention.

FIG. 8 depicts a flow diagram of illustrative file transfer logic. At S20, an entry for the file routing table is retrieved and at S21 a determination is made whether a transformation is requested. If no, a target file locator is generated and the file routing table is updated at S22. Next, the source file is transferred from the source node to the target node using the target file locator at S23. This is a request to initiate a peer-to-peer transfer, e.g., using the START TRANSFER verb as exposed by the file handling agent on the source file node. This can be exposed as a Web Service. The process may be implemented as a synchronous request-respond call. The related thread in the SOE 10 (FIG. 1) will remain active and in wait state until the completion of this transfer. At S24, the file routing table is updated with the file transfer code.

If a transformation is requested, the actual transformation service and location is retrieved from the Service Registry at S25. Next, target an intermediate file locators are generated and the file routing table is updated at S26. At S27, the source file is transferred from the source node to the transformation node using a "to-be-transformed" file locator. At S28 the file routing table is updated with the file transfer return code. Next, the to-be-transformed file is transformed at the transformation node at S29. Note that this is a synchronous call. The full process to transfer and individual file processing is synchronous, but all the processes run in parallel. At S30, the file routing table is updated with the file transfer return code (RC). At S31 the transformed file is transferred from the transformation node to the target node using the target file locator and at S32, the file routing table is updated with the file transfer return code. At S33, the transfer thread ends.

Figure 9:
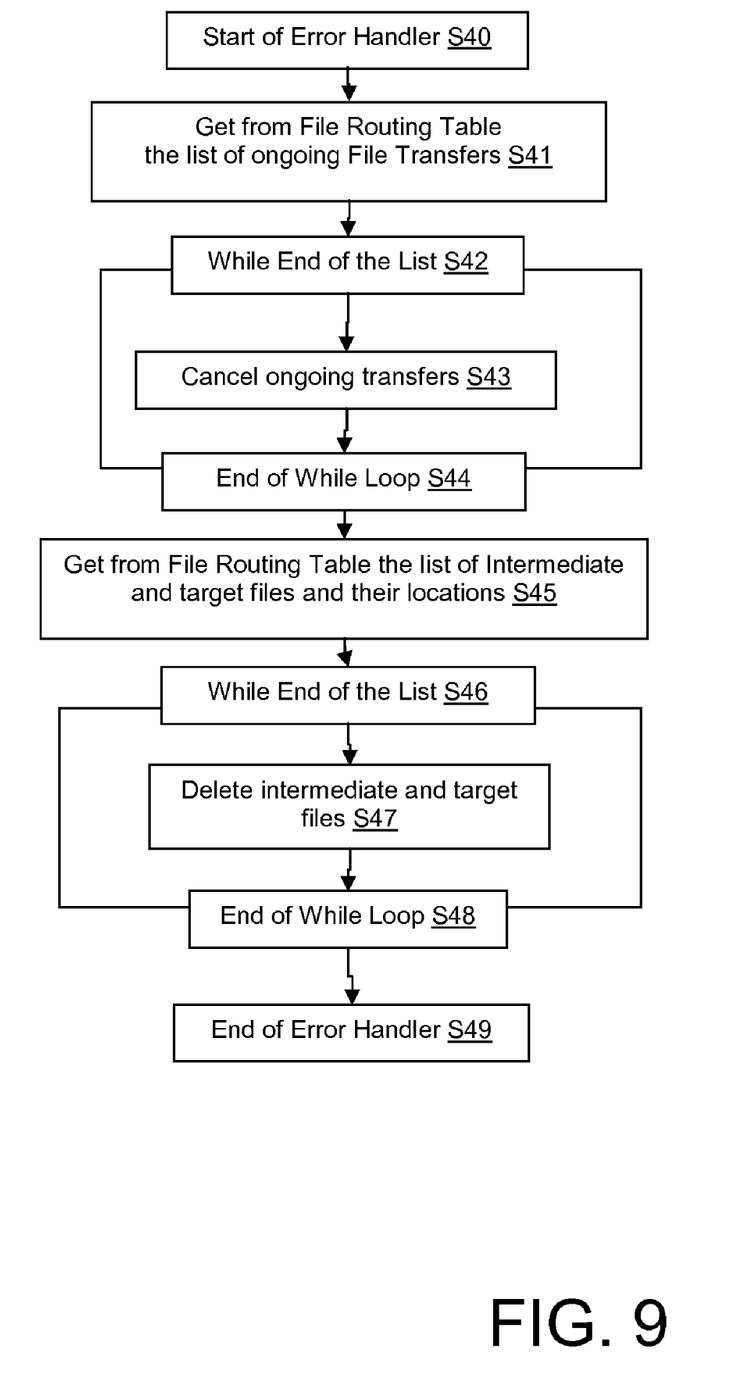
FIG. 9 depicts an illustrative error handling process in accordance with an embodiment of the present invention.

FIG. 9 depicts an illustrative error handling process in which the full transaction is rolled back such that all the intermediate files and unnecessary target files are deleted. In addition, all on-going file transfers are cancelled. The error handler process begins at S40, and at S41 the list of ongoing file transfers is retrieved from the file routing table. In steps S42, S43, and S44, the process loops such that all ongoing transfers are canceled. This is provided by the three STATUS attributes of each individual entry in the file routing table (FIG. 7). These should be set to IN-PROGRESS by the File Transfer Thread before issuing the transfer request At S45, the list of all intermediate and target files and their locations are retrieved from the file routing table. At S46, S47, and S48, the process loops such that all intermediate and target files are deleted. This is achieved with a call to the service implemented at the related file node (e.g., using the CANCEL TRANSFER verb as exposed by the file handling agent). The error handler process then ends at S49. In a further embodiment, restart capabilities (i.e., manual or automated) could be implemented.

File transfer agents can be implemented using either FTP or COTS (Commercial Off the Shelf) software products implementing managed file transfer capabilities. An aspect of the transfer process is the availability of the services interfaces as described above. These services include, e.g., START TRANSFER, CANCEL TRANSFER, START TRANSFORMATION, DELETE FILE and RENAME FILE. All these services are synchronous and should send back a Return Code. One illustrative implementation could use a J2EE application server that can implement the Web Services interfaces and rely on JMS flows to support the file transfers.

Referring again to FIG. 1, in general, SOE 10 and each of the file and meta-data nodes may be implemented using any type of computing device, and may be implemented as part of a client and/or a server. Such a computing device or system generally includes a processor, input/output (I/O), memory, and a bus. The processor may comprise a single processing unit, or be distributed across one or more processing units in one or more locations, e.g., on a client and server. Memory may comprise any known type of data storage, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus provides a communication link between each of the components in the computer system and likewise may comprise any known type of transmission link, including electrical, optical, wireless, etc. Additional components, such as cache memory, communication systems, system software, etc., may be incorporated into a computer system.

It should be appreciated that the teachings of the present invention could be offered as a business method on a subscription or fee basis. For example, a computer system comprising a service orchestration engine 10 could be created, maintained and/or deployed by a service provider that offers the functions described herein for customers. That is, a service provider could offer to provide SOA based data transfers as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A service oriented architecture (SOA) infrastructure that includes facilities for transferring structured data and associated unstructured data among nodes in a network, comprising:

a service orchestration engine (SOE) having a file orchestrator and a facility for receiving structured data from a first node and transferring the structured data to a second node; and a plurality of file handling agents installed at a plurality of respective file nodes, wherein a first file handling agent at a first file node and a second file handling agent at a second file node communicate with the file orchestrator to effectuate a peer-to-peer file transfer between the first file node and the second file node.

2. The SOA infrastructure of claim 1, wherein the SOE includes a transformation system for transforming structured data from a first format to a second format.

3. The SOA infrastructure of claim 1, further comprising a file transformation node for receiving unstructured data from a first file node, transforming the unstructured data, and sending transformed unstructured data to a second file node.

4. The SOA infrastructure of claim 1, wherein the structured data includes meta-data and the unstructured data comprises at least one binary file.

5. The SOA infrastructure of claim 1, wherein at least one of the file nodes comprise a file cache.

6. The SOA infrastructure of claim 1, wherein the SOE includes an error handling and restart capability.

7. The SOA infrastructure of claim 1, further comprising a file routing table for tracking information relating to a file of unstructured data being transfer between a first node and a second node.

8. The SOA infrastructure of claim 7, wherein the file orchestrator includes a parallel processing system for orchestrating a simultaneous transfer of at least two different files, wherein each transfer includes an associated entry in the file routing table.

9. A computer program product stored on a computer storage readable medium, which when executed by a computing device within a service oriented architecture (SOA) infrastructure, comprises:

program code that receives structured data from a first node and transfers the structured data to a second node; and program code that orchestrates peer-to-peer unstructured data transfers among a plurality of file nodes in the SOA infrastructure, including communicating with file handling agents installed in the plurality of file nodes, wherein the orchestration includes parallel processing of a plurality of peer-to-peer unstructured data transfers.

10. The computer program product of claim 9, further comprising program code that transforms structured data from a first format to a second format.

11. The computer program product of claim 9, further comprising program code for orchestrating a transformation of unstructured data.

12. The computer program product of claim 9, wherein the structured data includes meta-data and the unstructured data comprises at least one binary file.

13. The computer program product of claim 9, wherein at least one of the file nodes comprise a file cache.

14. The computer program product of claim 9, further comprising program code that provides an error handling and restart capability.

15. The computer program product of claim 9, further comprising a file routing table for tracking information relating to a file of unstructured data being transfer between a first node and a second node.

16. A method of transferring structured and unstructured data in a service oriented architecture (SOA) infrastructure, comprising:

receiving a request for a synchronization at a service orchestration engine (SOE), wherein the synchronization includes a transfer of structured meta-data from a first node to a second node and a transfer of unstructured file data from a first file node to a second file node;

creating an entry in a routing table to track the synchronization;

receiving the structured meta-data at the SOE from the first node and transferring the structured meta-data to the second node; and orchestrating a peer-to-peer data transfer from the first file node to the second file node, including communicating with file handling agents at the first and second file handling nodes.

17. The method of claim 16, further comprising transforming the structured meta-data data from a first format to a second format.

18. The method of claim 16, further comprising orchestrating a transformation of the unstructured file data.

19. The method of claim 16, wherein at least one of the file nodes comprise a file cache.

20. The method of claim 16, further comprising providing an error handling and restart capability if the synchronization fails.

21. The method of claim 16, further comprising orchestrating a simultaneous transfer of at least two different files, wherein each transfer includes an associated entry in the file routing table.

22. A method for deploying a system for transferring structured and unstructured data in a service oriented architecture (SOA) infrastructure, comprising:

providing a computer infrastructure being operable to:

provide a service orchestration engine (SOE);

receive a request for a synchronization at the SOE, wherein the synchronization includes a transfer of structured meta-data from a first node to a second node and a transfer of unstructured file data from a first file node to a second file node;

create an entry in a routing table to track the synchronization;

receive the structured meta-data at the SOE from the first node and transfer the structured meta-data to the second node; and orchestrate a peer-to-peer data transfer from the first file node to the second file node, including communicating with file handling agents at the first and second file handling nodes.

* * * * *